Sept. 16, 1952 E. F. MILLER 2,610,467
COMBUSTION CHAMBER HAVING TELESCOPING
WALLS AND CORRUGATED SPACERS
Filed April 3, 1946
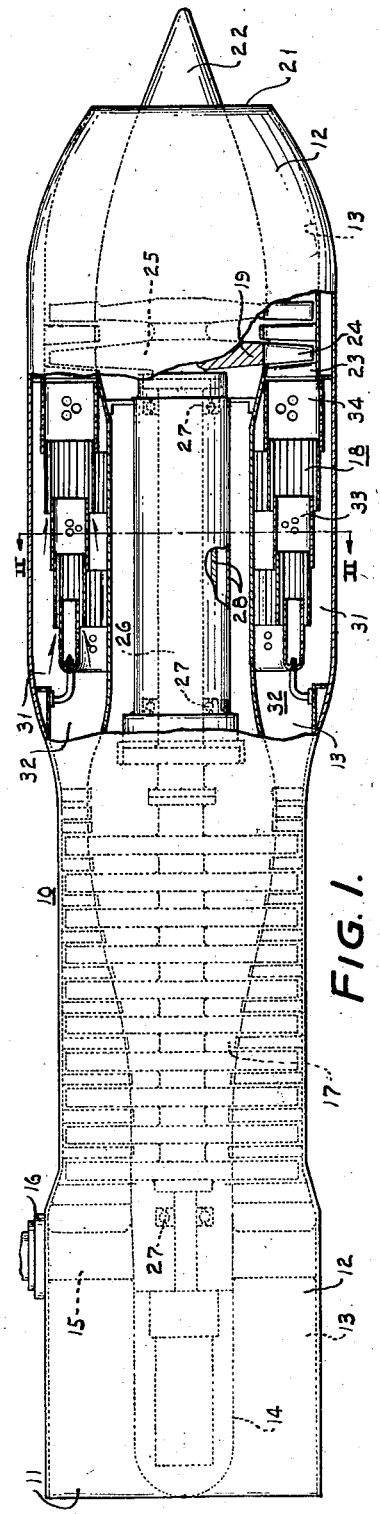
INVENTOR
ERNEST F. MILLER
BY
Ralph T. French
ATTORNEY Patented Sept. 16, 1952

2,610,467

UNITED STATES PATENT OFFICE 2,610,467

COMBUSTION CHAMBER HAVING TELESCOPING WALLS AND CORRUGATED SPACERS

Ernest F. Miller, Lansdowne, Pa., assignor to Westinghouse Electric Corporation, East Pittsburgh, Pa., a corporation of Pennsylvania Application April 3, 1946, Serial No. 659,284

5 Claims. (Cl. 60—39.32)

This invention relates to power plants and particularly to combustion apparatus for a gas turbine and it has for an object to provide an improved device of the character set forth.

It is a further object to provide a combustion apparatus of small size which is capable of handling a large volume of air and fuel mixture and complete combustion of the fuel in a relatively small space.

A power plant of this character operates over a wide range of fuel rates since the fuel rate for peak load, as at take-off, may be as much as ten times that for idling at high elevation. Further, the combustion apparatus must be able to burn the fuel and heat the air supplied by the compressor to a high temperature without danger of distorting the walls or causing excessive creep or corrosion of the apparatus.

Therefore, another object of the inventoin is to provide a combustion chamber including an outer wall made up of a series of annular sections disposed in stepped relation, with the adjacent ends overlapped and radially spaced in such a manner as to provide for admission of air therebetween to the combustion chamber within.

Yet another object of the invention is to provide a combustion chamber having an annular wall comprising a plurality of annular sections with their adjacent terminal portions disposed in overlapping relation together with novel connecting means between the overlapped terminal portions, which connecting means provide for relative expansion and contraction of the overlapped parts upon changes in temperature thereof.

The pressure drop across the combustion chamber, comparing the state at two stations of equal velocity, should be kept at an absolute minnium. It is, accordingly, a further object of the which can be developed by the turbine driven by the hot gases discharging from the combustion apparatus.

In prior constructions, where the combustion chamber wall between overlapping air and burner spaces is provided with openings whose axes extend generally at right angles to the planes of said wall, the air has had to make substantially right-angled turns to enter the burner space from the air space, resulting in pressure drops because of turning.

Therefore, another object of the invention is to provide a combustion chamber wall adapted to admit air with a minimum of pressure drop. This is accomplished by openings through the wall whose axes are substantially parallel to the plane of said wall.

The above-mentioned features, limitations, and requirements for the combustion apparatus of the gas turbine power plant for aircraft use apply also, but perhaps not as critically, to gas turbine power plants on small vessels of high power and speed, particularly Naval craft or in any installation where space and weight are at a premium. It is, accordingly, a further object of the invention to provide an improved combustion apparatus capable of satisfying the above-mentioned limitations and requirements in a gas turbine power plant.

These and other objects are effected by the invention as will be apparent from the following description and claims taken in connection with the accompanying drawing forming a part of this application, in which:

Fig. 1 is a side elevation of a gas turbine power plant incorporating the present invention, a portion of the outer casing and part of the burner tubes being removed to better illustrate the combustion apparatus;

Fig. 2 is a sectional view taken along the line II—II of Fig. 1, looking in the direction indicated by the arrows;

Fig. 3 is an enlarged detailed view of a portion of the combustion apparatus shown in Fig. 1; and Fig. 4 is a sectional view taken along the line IV—IV of Fig. 3, looking in the direction indicated by the arrows.

The power plan shown in Fig. 1 and generally indicated 10, is adapted to be mounted in or on the fuselage or wing of an airplane with the left or intake end 11, as viewed in this figure, pointed in the direction of flight.

The plant comprises an outer shell or casing structure 12 providing an annular air duct or passage 13 extending fore and aft with respect to the aircraft. This casing has mounted therein along its longitudinal axis a fairing cone 14 adapted to house gearing connected through a hollow guide vane 15 with auxiliaries 16, an axial-flow compressor 17, combustion apparatus generally indicated 18, a turbine 19 which drives the compressor, and a nozzle 21 defined by the casing 12 and by a tailpiece 22, the latter being mounted concentrically in the casing and cooperating with the latter to provide a propulsion jet.

Air enters at the intake end 11 and flows substantially straight through the plant, passing through the compressor 17, where it is compressed, and into the combustion apparatus 18, where it is heated. The hot gases, comprising the products of combustion and excess air heated by the combustion, on leaving the combustion apparatus, are directed by suitable guide vanes or nozzles 23 against the blades 24 of the turbine disc 25 and then are discharged through the propulsion nozzle 21 to propel the aircraft.

The present invention is not limited to the specific details or arrangement of the structure thus far described, but it is primarily concerned with the combustion apparatus which heats the compressed air supplied by the compressor with minimum disturbance of the straight-through flow of the plant, thereby permitting a design of small maximum diameter.

By reference to Fig. 1, it will be noted that the compressor and turbine rotors are interconnected by means of a shaft 26 supported in suitable bearings, indicated at 27, and enclosed by an inner casing structure, generally indicated 28, which protects the shaft and bearings from high temperatures and also defines the portion of the annular air flow passage 13 in which the combustion apparatus 18 is mounted.

In order to maintain the combustion apparatus and the outer casing structure of small maximum diameter, the combustion apparatus is divided by wall structure into an air space or spaces 31 open to the discharge end of a diffuser passage 32 leading from the compressor, and which overlap a burner space or spaces 33 open to a passage 34 leading to the turbine guide vanes 23. Atomized fuel is supplied to the forward end of the burner space or spaces which are also provided with ignition means (not shown). The dividing wall structure has openings therein to provide for entry into the burner space of compressed air from the overlapping air spaces, the entering air supporting combustion of fuel and mixing with the hot products of combustion to provide a motive fuel comprising a mixture of air and products of combustion of suitable temperature for driving the turbine.

The dividing wall structure separating the air and burner spaces may be constituted in any suitable manner, provided that it is disposed so that the air space overlaps axially the burner space or spaces and so that air may flow into the latter along the structure to enable combustion to be completed or substantially completed within the axial length of the burner spaces. In this way, the axial length of the apparatus is kept at a minimum because it does not require the division of the air stream into two distinct streams of primary and secondary air, the primary air being used to complete the combustion, with the remaining secondary air stream being mixed with the combusted gases to lower the final temperature.

The combustion apparatus, indicated generally by the reference character 18 and constituting the subject matter of the present invention, comprises an annular combustion chamber comprising spaced inner and outer walls 40 and 41, respectively, joined at the upstream end of the chamber by a nozzle block 42 on which are mounted a plurality of fuel nozzles 43 and which preferably is provided with a plurality of primary air admission openings 44 (Fig. 3). The outer annular wall comprises a series of annular sections 46, 47, 48, 49 and 50, while the inner annular wall comprises a corresponding series of annular sections 46a, 47a, 48a, 49a and 50a. The annular sections of the outer wall increase in diameter from the upstream to the downstream end thereof and the adjacent terminal portions of the adjacent sections are disposed in overlapped relation and preferably secured to each other by suitable means, for example, by spot-welding.

Alternate annular sections 47 and 49 are corrugated circumferentially, as best shown in Figs. 3 and 4, with the inwardly depressed portions 52 thereof engaging the adjacent smaller diameter sections and the outwardly-raised portions 53 contacting the adjacent larger diameter annular sections at which portions 52 and 53 of the spot-welding may be applied.

It will be apparent from consideration of Figs. 3 and 4 that this corrugated construction of the annular sections 47 and 49 provide axial passages 55 for entry of air to the annular combustion chamber.

Preferably, although not necessarily, the welding may be omitted from one of the overlapped joints, for example, that between the members 48 and 49, to provide a slip-joint permitting unrestrained longitudinal adjustment of the structure upon expansion and contraction thereof due to changes in the temperature thereof.

Obviously, the same construction is used for the inner wall 40 as that just described in connection with the outer wall 41 except that the diameters of the annular sections of the inner wall decrease from the upstream to the downstream end thereof with the result that the combustion chamber is of generally conical construction and of increasing cross-sectional area in the direction of flow therethrough.

In addition to the air admission openings 55, provided by the corrugated construction of the alternate annular sections, additional admission openings may be provided in any or all of the annular sections 46, 47, 48, 49 and 50 at whatever points it is found desirable to admit additional quantities of air.

While the invention has been shown in but one form, it will be obvious to those skilled in the art that it is not so limited but is susceptible of various changes and modifications without departing from the spirit thereof.

What is claimed is:

1. An annular side wall for a combustion chamber having upstream and downstream ends, considered in the general direction of flow of gases therethrough, said side wall comprising a series of annular sections, each of said sections having both its upstream end and its downstream end disposed downstream of the corresponding ends of the adjacent section upstream thereof, and annular spacing members positioned between and joining adjacent sections of said series, said spacing members being corrugated circumferentially, whereby passages are provided for admission of air to the chamber through the annular wall.

2. An annular side wall for a combustion chamber having upstream and downstream ends, considered in the general direction of flow of gases therethrough, said side wall comprising a series of annular sections, each of said sections having both its upstream end and its downstream end disposed downstream of the corresponding ends of the adjacent section upstream thereof, and annular spacing members disposed between and joining adjacent sections of said series, said spacing members being corrugated circumferentially and the annular sections being smooth, whereby passages are provided for admission of air to the chamber through the annular wall.

3. In a combustion chamber adapted for admission of fuel to one end thereof and discharge of hot products of combustion from the opposite end thereof, a generally frusto-conical wall extending from said one end to said opposite end and comprising an axial series of annular sections, each of said sections having its upstream end disposed downstream of the downstream end of the adjacent section upstream thereof, annular spacing members positioned between adjacent sections of said series, said sections and spacing members having their adjacent ends in overlapping relation, at least one of said spacing members having its lapped ends corrugated circumferentially, the section which is lapped by said corrugated end being smooth, whereby passages are provided for flow of air into the chamber from the exterior of said frusto-conical wall.

4. In a combustion chamber adapted for admission of fuel to the upstream end thereof and the discharge of hot gases from the downstream end thereof, an annular wall extending from said upstream end to said downstream end, said annular wall comprising an axial series of cylindrical sections, each of said sections having its upstream end disposed downstream of the downstream end of the adjacent section upstream thereof, and cylindrical corrugated spacing members disposed between adjacent sections, said sections and spacing members being arranged with their adjacent ends in telescopic relation with the downstream end of each section disposed within the upstream end of the adjacent downstream spacing member and each section being of an internal diameter at least as great as the outside diameter of the adjacent upstream spacing member.

5. In combination, concentric inner and outer conical walls defining a divergent annular combustion chamber, each of said walls comprising an axial series of annular sections arranged with their adjacent ends overlapping, and at least one of said sections being corrugated circumferentially and positioned between a pair of smooth-walled sections, whereby the joints provided by the overlapping adjacent corrugated and smooth-walled sections have axial openings providing for flow of air into the chamber from the exterior of said walls.

ERNEST F. MILLER.

REFERENCES CITED

The following references are of record in the file of this patent:

UNITED STATES PATENTS

| Number | Name | Date |
| --- | --- | --- |
| 1,311,235 | Kemp | July 29, 1919 |
| 2,181,138 | Landis | Nov. 28, 1939 |
| 2,268,464 | Seippel | Dec. 30, 1941 |
| 2,446,059 | Peterson | July 27, 1948 |
| 2,448,561 | Way | Sept. 7, 1948 |
| 2,471,892 | Price | May 31, 1949 |
| 2,474,258 | Kroon | June 28, 1949 |

FOREIGN PATENTS

| Number | Country | Date |
| --- | --- | --- |
| 539,069 | Great Britain | Aug. 27, 1941 |